(12) United States Patent
Morimitsu et al.

(10) Patent No.: US 8,882,897 B2
(45) Date of Patent: Nov. 11, 2014

(54) PHASE CHANGE INKS COMPRISING AROMATIC DIESTER CRYSTALLINE COMPOUNDS

(75) Inventors: Kentaro Morimitsu, Mississauga (CA); Jennifer L. Belelie, Oakville (CA); Naveen Chopra, Oakville (CA); Gabriel Iftime, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 84 days.

(21) Appl. No.: 13/457,300

(22) Filed: Apr. 26, 2012

(65) Prior Publication Data

US 2013/0284061 A1      Oct. 31, 2013

(51) Int. Cl.
    *C09D 11/02*      (2014.01)

(52) U.S. Cl.
    USPC ..................... 106/31.61; 106/31.13

(58) Field of Classification Search
    None
    See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 5,876,492 A | 3/1999 | Malhotra et al. | |
| 6,221,137 B1 | 4/2001 | King et al. | |
| 6,306,203 B1 * | 10/2001 | Malhotra et al. | 106/31.29 |
| 6,334,890 B1 * | 1/2002 | Goodbrand et al. | 106/31.43 |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,186,762 B2 | 3/2007 | Wong et al. | |
| 7,381,831 B1 | 6/2008 | Banning et al. | |
| 7,427,323 B1 | 9/2008 | Birau et al. | |
| 2002/0124771 A1 | 9/2002 | Hendricks et al. | |
| 2008/0302272 A1 * | 12/2008 | Allen et al. | 106/31.77 |
| 2010/0086683 A1 | 4/2010 | Birau et al. | |
| 2012/0272865 A1 | 11/2012 | Morimitsu et al. | |
| 2012/0274699 A1 | 11/2012 | Belelie et al. | |

OTHER PUBLICATIONS

Belelie, J.L., et al., U.S. Appl. No. 13/095,636, filed Apr. 27, 2011.
Morimitsu, K., et al., U.S. Appl. No. 13/095,784, filed Apr. 27, 2011.
Morimitsu, K., et al., U.S. Appl. No. 13/095,795, filed Apr. 27, 2011.

* cited by examiner

*Primary Examiner* — Yun Qian
(74) *Attorney, Agent, or Firm* — Pillsbury Winthrop Shaw Pittman LLP

(57) ABSTRACT

A phase change ink composition suitable for high speed ink jet printing, including printing on coated paper substrates. In particular, the phase change ink composition comprises an aromatic diester crystalline compound and an amorphous compound, and optionally, a colorant, which provides for a robust ink.

10 Claims, 3 Drawing Sheets

PHASE CHANGE INKS COMPRISING AROMATIC DIESTER CRYSTALLINE COMPOUNDS

CROSS-REFERENCE TO RELATED APPLICATIONS

Reference is made to commonly owned and co-pending, U.S. patent application Ser. No. 13/456,619 entitled "Phase Change Ink Compositions Comprising Crystalline Diurethanes And Derivatives Thereof" to Naveen Chopra et al., electronically filed on the same day herewith; U.S. patent application Ser. No. 13/457,323 entitled "Phase change ink Compositions Comprising Crystalline Sulfone Compounds and Derivatives Thereof" to Kentaro Morimitsu et al., electronically filed on the same day herewith; U.S. patent application Ser. No. 13/457,221 entitled "Phase Change Inks Comprising Crystalline Amides" to Kentaro Morimitsu et al., electronically filed on the same day herewith; U.S. patent application Ser. No. 13/456,916 (not yet assigned) entitled "Phase Change Ink Compositions Comprising Aromatic Ethers" to Kentaro Morimitsu et al., electronically filed on the same day herewith; U.S. patent application Ser. No. 13/457,157 entitled "Fast Crystallizing Crystalline-Amorphous Ink Compositions and Methods for Making the Same" to Gabriel Iftime et al., electronically filed on the same day herewith; U.S. patent application Ser. No. 13/457,271 entitled "Rapid Solidifying Crystalline-Amorphous Inks" to Gabriel Iftime et al., electronically filed on the same day herewith; U.S. patent application Ser. No. 13/456,993 entitled "Phase Change Inks Comprising Inorganic Nucleating Agents" to Daryl W. Vanbesien et al., electronically filed on the same day herewith; U.S. patent application Ser. No. 13/456,722 entitled "Phase Change Inks Comprising Fatty Acids" to Gabriel Iftime et al., electronically filed on the same day herewith; U.S. patent application Ser. No. 13/457,068 entitled "Phase Change Ink Compositions Comprising Diurethanes as Amorphous Materials" to Naveen Chopra et al., electronically filed on the same day herewith; U.S. patent application Ser. No. 13/456,805 entitled "Phase Change Inks Comprising Organic Pigments" to Jennifer Belelie et al., electronically filed on the same day herewith; U.S. patent application Ser. No. 13/456,847 entitled "TROM Process for Measuring the Rate of Crystallization of Phase Change Inks" to Gabriel Iftime et al., electronically filed on the same day herewith; and U.S. patent application Ser. No. 13/456,679 entitled "Rapidly Crystallizing Phase Change Inks and Methods for Forming the Same" to Jennifer Belelie et al., electronically filed on the same day herewith; the entire disclosures of which are incorporated herein by reference in its entirety.

BACKGROUND

The present embodiments relate to phase change ink compositions characterized by being solid at room temperature and molten at an elevated temperature at which the molten ink is applied to a substrate. These phase change ink compositions can be used for ink jet printing. The present embodiments are directed to a novel phase change ink composition comprising an amorphous compound, a crystalline compound, and optionally a colorant, and methods of making the same. In particular, the amorphous compound is an ester of tartaric acid and the crystalline compound is an amide.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates.

There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising an amorphous compound, and a crystalline compound comprising an aromatic diester, for high speed ink jet printing, including printing on coated paper substrates.

In particular, the present embodiments provide a phase change ink comprising an amorphous compound; and a crystalline compound comprising the following structure:

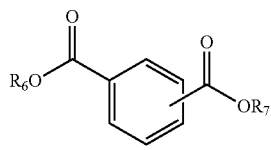

Formula III wherein $R_6$ and $R_7$ can be the same or different, and wherein $R_6$ and $R_7$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group having from about 1 to about 40 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group having from about 4 to about 40 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group having from about 3 to about 40 carbon atoms, and mixtures thereof; wherein the phase change ink crystallizes in less than 15 seconds.

In further embodiments, there is provided phase change ink comprising an amorphous compound comprises an ester of tartaric acid of Formula I or an ester of citric acid of Formula II

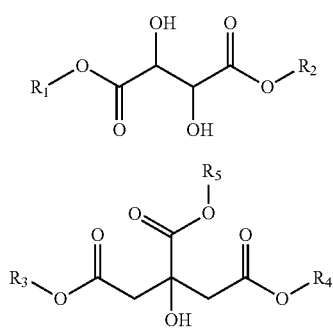

Formula I

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof, wherein the tartaric acid backbone is selected from L-(+)-tartaric acid, D-(−)-tartaric acid, DL-tartaric acid, or mesotartaric acid, and mixtures thereof; a crystalline compound comprises the following structure:

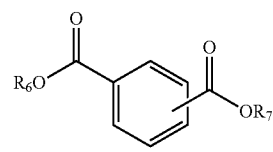

Formula III wherein each $R_6$ and $R_7$ is independently alkyl or aryl, optionally substituted with hydroxyl, or —O(CH=CH$_2$); and a colorant.

In yet other embodiments, there is provided a phase change ink comprising an amorphous compound comprising

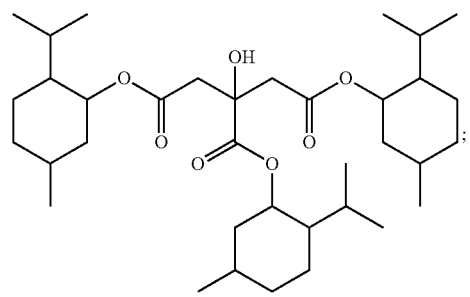 [SMILES: CC1CCC(C(C)C)C(OC(=O)CC(O)(CC(=O)OC2CC(C)CCC2C(C)C)C(=O)OC2CC(C)CCC2C(C)C)C1]

a crystalline compound comprising the following structure

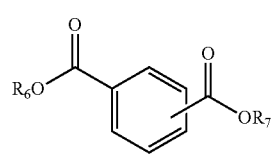

Formula III wherein $R_6$ and $R_7$ can be the same or different, and wherein $R_6$ and $R_7$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group having from about 1 to about 40 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group having from about 4 to about 40 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group having from about 3 to about 40 carbon atoms, and mixtures thereof.

BRIEF DESCRIPTION OF THE DRAWINGS

For a better understanding of the present embodiments, reference may be had to the accompanying figures.

DETAILED DESCRIPTION

Figure 1:
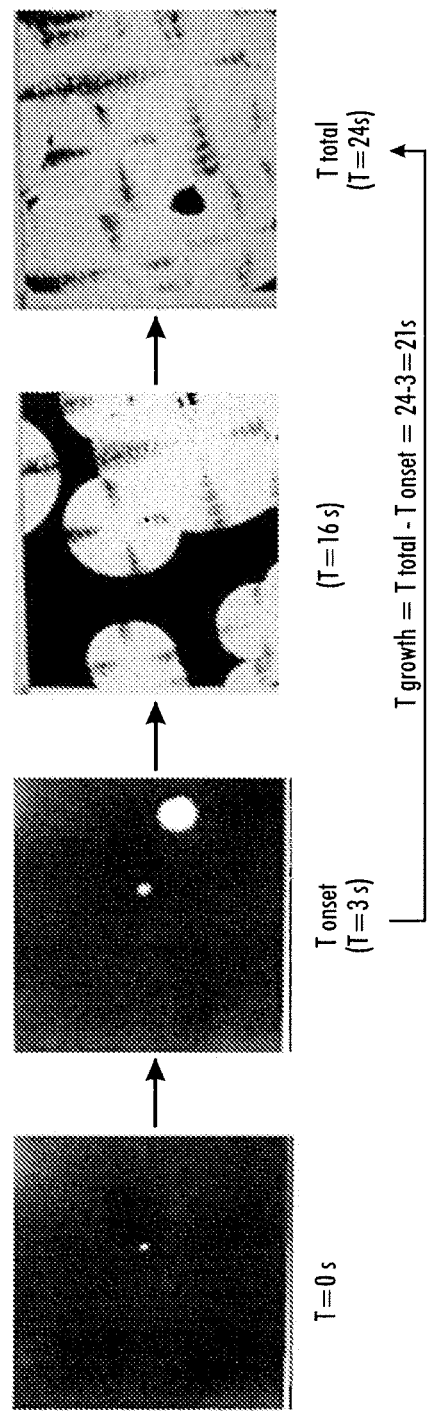
FIG. 1 illustrates the TROM process showing images of crystalline formation in an ink base from crystallization onset to crystallization completion according to an embodiment of the disclosure.

In the following description, it is understood that other embodiments may be utilized and structural and operational changes may be made without departure from the scope of the present embodiments disclosed herein.

Phase change ink technology broadens printing capability and customer base across many markets, and the diversity of printing applications will be facilitated by effective integration of printhead technology, print process and ink materials. The phase change ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

It was previously discovered that using a mixture of crystalline and amorphous small molecule compounds in solid ink formulations provides robust inks, and in particular, solid inks which demonstrate robust images on coated paper. (U.S. patent application Ser. No. 13/095,636 entitled "Solid Ink Compositions Comprising Crystalline-Amorphous Mixtures" to Jennifer L. Belelie et al., filed Apr. 27, 2011.

However, the present inventors discovered that in many cases mixtures made of crystalline and amorphous materials with optional dye colorant solidify slowly when printed on substrates from a molten state. Such slow solidifying inks are not suitable for high speed printing environments, like for example production printing, where printing at speeds higher than 100 feet per minute is required. Solidification of the ink is due to crystallization of the crystalline component in the ink when cooling.

The inventors have found that fast crystallization of a composition made of a crystalline and an amorphous component is not an inherent property of the composition.

The present embodiments provide novel phase change ink compositions comprising crystalline aromatic diester materials and amorphous materials which crystallize fast and are therefore suitable for high speed ink jet printing, including printing on coated paper.

The present embodiments provide a new type of ink jet phase change ink composition which comprises a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10, or is from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the phase change inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

The Amorphous Compound

In embodiments, the amorphous compound comprises an ester of tartaric acid of Formula I or an ester of citric acid of Formula II

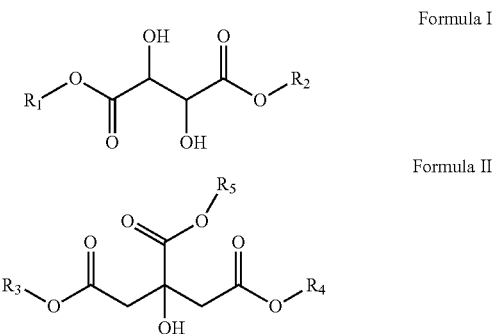

wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof. In certain embodiments, each $R_1$, $R_2$ $R_3$, $R_4$ and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl. In certain embodiments, $R_1$, $R_2$, $R_3$, $R_4$ and $R_5$ are each 2-isopropyl-5-methylcyclohexyl or a mixture of 4-t-butylcyclohexyl and cyclohexyl.

Referring to Formula I, in certain embodiments, one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiments, $R_1$ and $R_2$ are each 2-isopropyl-5-methylcyclohexyl. In certain embodiment, $R_1$ is 2-isopropyl-5-methylcyclohexyl and $R_2$ is 4-t-butylcyclohexyl. In certain embodiment, $R_1$ is 2-isopropyl-5-methylcyclohexyl and $R_2$ is cyclohexyl. In certain embodiment, $R_1$ is 4-t-butylcyclohexyl and $R_2$ is cyclohexyl.

Referring to Formula II, in certain embodiments, one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_1$ is 4-t-butylcyclohexyl and $R_4$ and $R_5$ are each cyclohexyl.

Some suitable amorphous materials are disclosed in U.S. patent application Ser. No. 13/095,784 to Morimitsu et al., which is hereby incorporated by reference in its entirety. The amorphous materials may comprise an ester of tartaric acid having a formula of

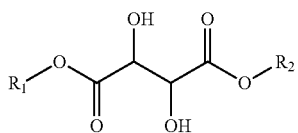

wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

To synthesize the amorphous component, tartaric acid was reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomenthol, and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2-, 3-, or 4-tert-butyl-cyclohexanol).

In embodiments, two or more molar equivalents of alcohol may be used in the reaction to produce the di-esters of tartaric acid. If one molar equivalent of alcohol is used, the result is mostly mono-esters.

Other suitable amorphous components include those disclosed in U.S. patent application Ser. No. 13/095,795 to Morimitsu et al., which is hereby incorporated by reference in its entirety. The amorphous materials may comprise a compound having the following structure:

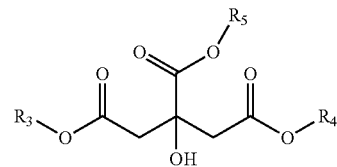

$R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof.

These amorphous materials are synthesized by an esterification reaction of citric acid. In particular, citric acid was reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

In embodiments, the amorphous compounds are formulated with a crystalline compound to form a phase change ink composition. The ink compositions show good rheological profiles. Print samples created by the phase change ink composition on coated paper by K-proof exhibit excellent robustness. Furthermore, using citric acid as an ester base has additional advantages of being derived from a potential bio-derived source.

In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound

In embodiments, the crystalline compound comprises the following structure:

Formula III

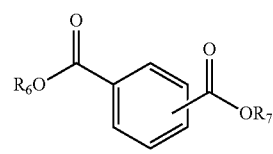

wherein $R_6$ and $R_7$ can be the same or different, and wherein $R_6$ and $R_7$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to about 40 carbon atoms, from about 6 to about 20 carbon atoms, or from about 6 to about 10 carbon atoms, although the numbers can be outside of these ranges, and mixtures thereof.

In certain embodiments, each $R_6$ and $R_7$ is independently alkyl. In certain of such embodiments, each $R_6$ and $R_7$ is independently a $C_1$-$C_{40}$ linear alkyl optionally substituted with one or more alkyl such as methyl or ethyl. In specific embodiments, each $R_6$ and $R_7$ is independently t-butyl, or 2-ethylhexyl. In certain of such embodiments, each $R_6$ and $R_7$ is independently a $C_1$-$C_{40}$ linear alkyl optionally substituted with one or more hydroxyl or —O(CH=$CH_2$). In specific embodiments, each $R_6$ and $R_7$ is independently 2-hydroxyethyl. In certain embodiments, each $R_6$ and $R_7$ is independently aryl. In certain of such embodiments, each $R_6$ and $R_7$ is independently phenyl or benzyl. In certain embodiments, each $R_6$ and $R_7$ is independently selected from methyl, ethyl, isopropyl, t-butyl, cyclohexyl, phenyl, benzyl, 2-ethylhexyl, 4-(vinyloxy)butyl, or 2-hydroxyethyl.

In embodiments, the crystalline compound comprises Formula III with a particular spatial arrangement such as "para" for 1,4-substitution, "meta" for 1,3-substitution, or "ortho" for 1,2-substitution as shown below:

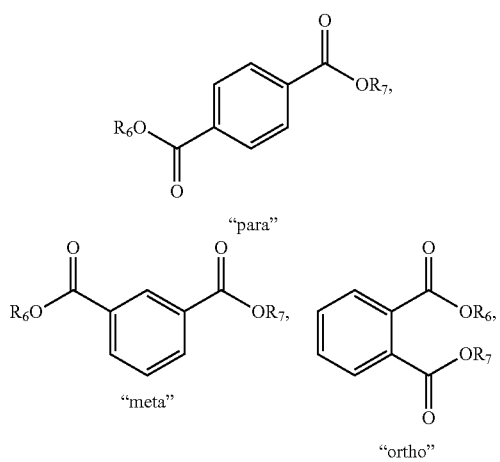

The crystalline materials show sharp crystallization, relatively low viscosity (≤$10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

In embodiments, the crystalline material is present an amount of from about 60 percent to about 95 percent by weight, or from about 65 percent to about 95 percent by weight, or from about 70 percent to about 90 percent by weight of the total weight of the ink composition.

In the present embodiments, the phase change ink composition may also comprise the crystalline and amorphous material in combination with a colorant. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds show good rheological profiles and that meet the many requirements for ink jet printing.

The ink composition, in specific embodiments, comprises a colorant, which may be a pigment or dye, present in the ink composition in an amount of at least from about 0.1 percent to about 50 percent by weight, or at least from about 0.2 percent to about 20 percent by weight, from about 0.5 percent to about 10 percent by weight, from about 1 percent to about 5 percent by weight of the total weight of the ink composition.

Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, in the molten state, the resulting solid ink has a viscosity of from about 1 to about 22 cps, or from about 4 to about 15 cps, or from about 6 to about 12 cps, at the jetting temperature. The jetting temperature is typically comprised in a range from about 100° C. to about 140° C. In embodiments, the solid ink has a viscosity of about $>10^6$ cps, at room temperature. In embodiments, the solid ink has a $T_{melt}$ of from about 65 to about 140° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF), 2,2-bis (4-(2-(3,5-di-tert-butyl-4-hydroxyhydrocinnamoyloxy)) ethoxyphenyl)propane (TOPANOL-205, available from Vertullus), tris(4-tert-butyl-3-hydroxy-2,6-dimethyl benzyl) isocyanurate (Aldrich), 2,2'-ethylidene bis(4,6-di-tert-butylphenyl)fluoro phosphonite (ETHANOX-398, available from Albermarle Corporation), tetrakis(2,4-di-tert-butylphenyl)-4,4'-biphenyl diphosphonite (Aldrich), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-trifluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis(trifluoromethyl)benzoic acid (Aldrich), ethyl-2-(4-(4-(trifluoromethyl)phenoxy)phenoxy)propionate (Aldrich), tetrakis (2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

Pigment dispersions in the ink base may be stabilized by dispersants. Also, to enable dispersion of the pigments in the liquid vehicle, a dispersant or combination of dispersants may optionally be provided. Typically, dispersants may be used to stabilize particles in the non-polar ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like.

Thus, examples of suitable first functional groups that anchor the dispersant to the pigment particles include such functional groups as esters, amides, carboxylic acids, hydroxyl groups, anhydrides, urethanes, ureas, amines, amides, salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -4340, -2025, -2035, -2040, -2021, -3600, -3232; SOLSPERSE 13240, 16000, 17000, 17940, 19000, 28000, 32500, 32000 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the phase change ink in any effective amount, such as in amounts of from about 0.5% to about 40% by weight of the ink, such as from about 5% to about 25%, or from about 8% to about 13%.

In embodiments, in the molten state, the ink carriers for the phase change inks may have a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >$10^6$ cps, at room temperature. In embodiments, the solid ink has a $T_{melt}$ of from about 65 to about 140° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including coated and plain paper. Coated paper includes silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like. Plain paper includes such as XEROX 4200 papers, XEROX Image Series papers, Courtland 4024 DP paper, ruled notebook paper, bond paper. Transparency materials, fabrics, textile products, plastics, polymeric films, inorganic recording mediums such as metals and wood, may also be used.

Such robust inks may be used with printing equipment at high speeds. Typically, production digital presses print at a speed comprised from about 100 to 500 or more feet/minute. This requires inks which are capable of solidifying very fast once placed onto the paper, in order to prevent offset of the printed image during fast printing process, where printed paper is either stacked (cut-sheet printers) or rolled (continuous feed printers). Fast crystallization is not a general or inherent property of crystalline-amorphous robust inks. Therefore not all crystalline-amorphous inks are suitable for fast printing. The present inventors have discovered specific crystalline aromatic diester compounds which when used in conjunction with specific amorphous compounds provide fast crystallization, therefore enabling fast printing.

In order to evaluate the suitability of a test ink for fast printing a quantitative method for measuring the rates of crystallization of phase change inks containing crystalline components was developed. TROM (Time-Resolved Optical Microscopy) enables comparison between various test samples and, as a result, is a useful tool for monitoring the progress made with respect to the design of fast crystallizing inks.

TROM is described in co-pending U.S. patent application Ser. No. 13/456,847 entitled "TROM Process for Measuring the Rate of Crystallization of Phase change inks" to Gabriel Mime et al., electronically filed on the same day herewith, Time Resolved Optical Microscopy (TROM) monitors the appearance and the growth of crystals by using Polarized Optical Microscopy (POM). The sample is placed between crossed polarizers of the microscope. Crystalline materials are visible because they are birefringent. Amorphous materials or liquids, similar to, for example, inks in their molten state that do not transmit light, appear black under POM. Thus, POM enables an image contrast when viewing crystalline components and allows for pursuing crystallization kinetics of crystalline-amorphous inks when cooled from the molten state to a set-temperature. Polarized optical microscopy (POM) enables exceptional image contrast when viewing crystalline components.

In order to obtain data that allow comparison between different and various samples, standardized TROM experimental conditions were set, with the goal of including as many parameters relevant to the actual printing process.

The key set parameters include:

(a) glass slides of a 16-25 mm diameter and a thickness comprised in between 0.2 mm to 0.5 mm.

(b) ink sample thickness comprised in a range from 5 to 25 microns (c) cooling temperature set at 40° C.

For rate of crystallization measurement, the sample is heated to the expected jetting temperature (viscosity=10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this invention). Crystal formation and growth is recorded with a camera.

The key steps in the TROM process are illustrated in FIG. 1, highlighting the key steps in the measuring process with the mainline ink base which contains just amorphous and crystalline components (no dye or pigment). When viewed under POM, the molten and at time zero, the crystalline-amorphous inks appear black as no light is passed through. As the sample crystallizes, the crystalline areas appear brighter. The numbers reported by TROM include: the time from the first crystal (crystallization onset) to the last (crystallization completion).

The definition of key measured parameters of the TROM process are set forth below:

Time zero (T=0 s)—the molten sample is placed on the cooling stage under microscope T onset=the time when the first crystal appears T growth=the duration of the crystal growth from the first crystal (T onset) to the completion of the crystallization (T total)

T total=T onset+T growth

It should be understood that the crystallization times obtained with the TROM method for selected inks are not identical to what would be the crystallization times of a droplet of ink in an actual printing device. In an actual printing device such as a printer, the ink solidifies much faster. We determined that there is a good correlation between the total crystallization time as measured by the TROM method and the solidification time of an ink in a printer. In the standardized conditions described above, we determined that inks solidify within 10-15 second or less measured by the TROM method, are suitable for fast printing, typically at speeds from 100 feet/minute or higher. Therefore, for the purpose of the present disclosure, a rate of crystallization lower than 15 seconds is considered to be fast crystallizing.

In certain embodiments, the phase change ink crystallizes in less than 15 seconds.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Crystalline Compounds

Suitable diesters of terephthalic acid and isophthalic acid for use in accordance with the present disclosure are shown in Table 1. These were chosen based on their melting temperature ($T_{melt}$). Samples were either synthesized or purchased from commercial sources. Dicyclohexyl terephthalate (T2), di-tert-butyl terephthalate (T3), dibenzyl terephthalate (T5), dicyclohexyl isophthalate (I2), di-tert-butyl isophthalate (I3), and dibenzyl isophthalate (I5) were synthesized, and the other materials were purchased from Sigma-Aldrich.

TABLE 1

Thermal Properties of Aromatic Diesters

| # | Core Structure | —R$_{13}$ | $T_{melt}$ (° C.)* | $T_{crys}$ (° C.)* | $T_{melt}$ − $T_{crys}$ (° C.) |
|---|---|---|---|---|---|
| T1 | (terephthalate core) | —CH$_3$ | 143 | 132 | 11 |
| T2 | | cyclohexyl | 88 | 42 | 46 |
| T3 | | tert-butyl | 117 | 75 | 42 |
| T4 | | phenyl | 191 | ** | |
| T5 | | benzyl | 95 | 39 | 56 |
| T6 | | 2-ethylhexyl | 32 | ** | |
| T7 | | pentyl vinyl ether | 45 | ** | |
| T8 | | hydroxypropyl | 107 | 62 | 45 |
| I1 | (isophthalate core) | —CH$_3$ | 68 | 29 | 39 |
| I2 | | cyclohexyl | *** | *** | |
| I3 | | tert-butyl | 83 | **** | |
| I4 | | phenyl | 138 | 88 | 50 |

TABLE 1-continued

Thermal Properties of Aromatic Diesters

| # | Core Structure | —R13 | $T_{melt}$ (°C.)* | $T_{crys}$ (°C.)* | $T_{melt}-T_{crys}$ (°C.) |
|---|---|---|---|---|---|
| I5 | | benzyl (CH2-C6H5) | 149 | 38 | 111 |
| P1 | phthalate (ortho diester) | —CH3 | 2 | ** | |
| P2 | phthalate (ortho diester) | cyclohexyl (methylcyclohexane shown) | 65 | ** | |

*$T_{melt}$ = melting temperature, $T_{crys}$ = crystallization temperature. Determined by DSC at a rate of 10° C./min.
**Data not available or not measured.
***Liquid at room temperature.
****Not crystallized under this DSC condition.

Synthesis of Dicyclohexyl Terephthalate (T2)

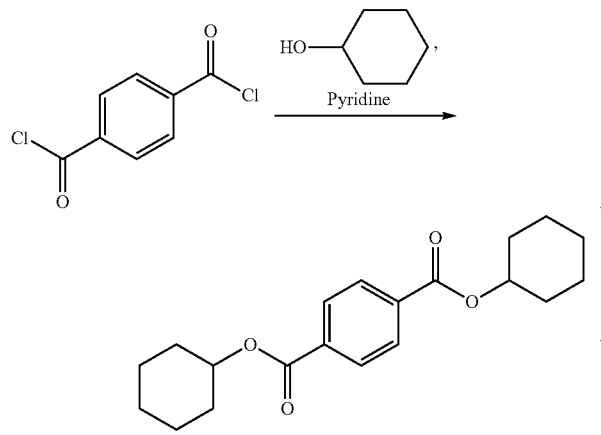

In a 1 L flask with a dropping funnel, cyclohexanol (62.2 g, 621 mmol) and dichloromethane (200 mL) were added to give a colorless solution. Pyridine (52.6 ml, 650 mmol) was added and the flask was cooled with an ice bath. Terephthaloyl dichloride (60.0 g, 296 mmol) in dichloromethane (120 mL) was slowly added to the mixture over 60 min and the funnel was rinsed with dichloromethane (10 mL). After the addition, the reaction mixture was refluxed for 3 hours and cooled to room temperature. The reaction mixture was washed with 200 mL of 1M HCl aq. (1 time), NaHCO3 aq. (2 times), and water (2 times). The organic layer was dried over MgSO4. After filtration, the solvent was removed and obtained crystals were recrystallized from 150 mL of methanol (83.8 g, yield: 86%). The sample was characterized by $^1$H NMR spectroscopy.

Synthesis of Di-tert-butyl Terephthalate (T3)

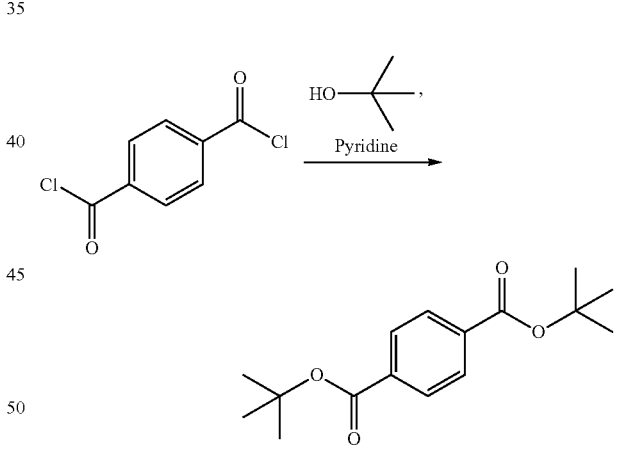

In a 500 mL flask, terephthaloyl dichloride (25.00 g, 123 mmol) and tert-butanol (95 ml, 998 mmol) were added to give a suspension. Pyridine (20.45 ml, 253 mmol) was added and the reaction mixture was stirred at 70° C. After 2 hours, the reaction mixture was cooled to room temperature. The solid cake was poured into water, then filtrated and rinsed with water. The solid was dissolved in ether and washed with NaHCO3 aq. (1 time), and water (1 time). The solvent of the organic layer was removed in vacuo and the resulting crystals were recrystallized from 120 mL of EtOH/water (75/25) (26.3 g, yield: 77%). The sample was characterized by $^1$H NMR spectroscopy.

Figure 2:
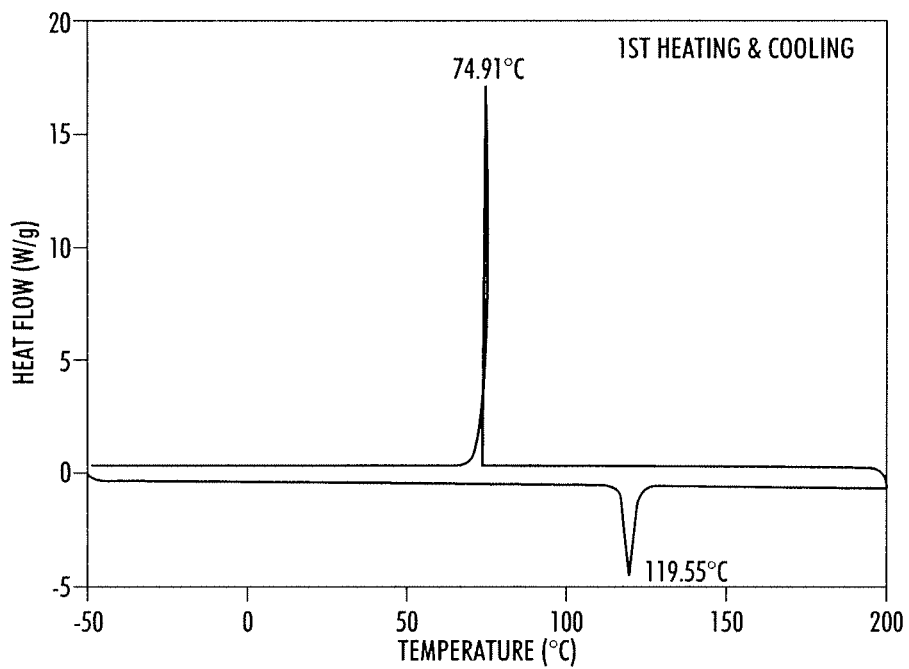
FIG. 2 is a graph illustrating differential scanning calorimetry (DSC) data of a crystalline compound of a phase change ink made according to the present embodiments (the DSC data was obtained on a Q1000 Differential Scanning Calorimeter (TA Instruments) at a rate of 10° C./min from −50 to 200 to −50° C.).

The crystallization temperature ($T_{crys}$) was measured by differential scanning calorimetry (DSC). FIG. 2 shows the DSC data of di-tert-butyl terephthalate (T3). Some materials showed very sharp transitions within the desirable temperature range (i.e., 60° C.<T<130° C.) (Table 1) indicating promising properties for the phase changing material of the ink.

Among the derivatives, compounds T3, T8, and I4 showed desirable thermal properties. However, compound T8 was not miscible with the amorphous material. Compound I4 was miscible, but did not crystallize when blended with the amorphous. Compound T3 is the most promising material based on this examination. The relatively narrow gap between $T_{melt}$ and $T_{crys}$ of T3 translates to a rapid phase change, making this material an especially good candidate for the crystalline component of the ink.

Example 2

Preparation of Ink Base

Tri-DL-menthyl citrate (TMC) was selected for the amorphous compound of the ink base formulation. TMC was synthesized as described in U.S. patent application Ser. No. 13/095,795 entitled "Phase Change Ink Compositions Comprising Amorphous Esters of Citric Acid" to Morimitsu et al., which is incorporated by reference in its entirety. Compound T3 (crystalline compound) and the TMC (amorphous compound) were stirred in the molten state at 130° C., then cooled down to obtain an ink base sample. The crystalline/amorphous ratio of the ink base sample was 70/30 in weight percent. 2 grams of the ink base was formulated from 1.4 grams of Compound T3 and 0.6 grams of TMC. The crystalline and amorphous materials were well miscible in this mixing ratio.

Ink Base Properties

Figure 3:
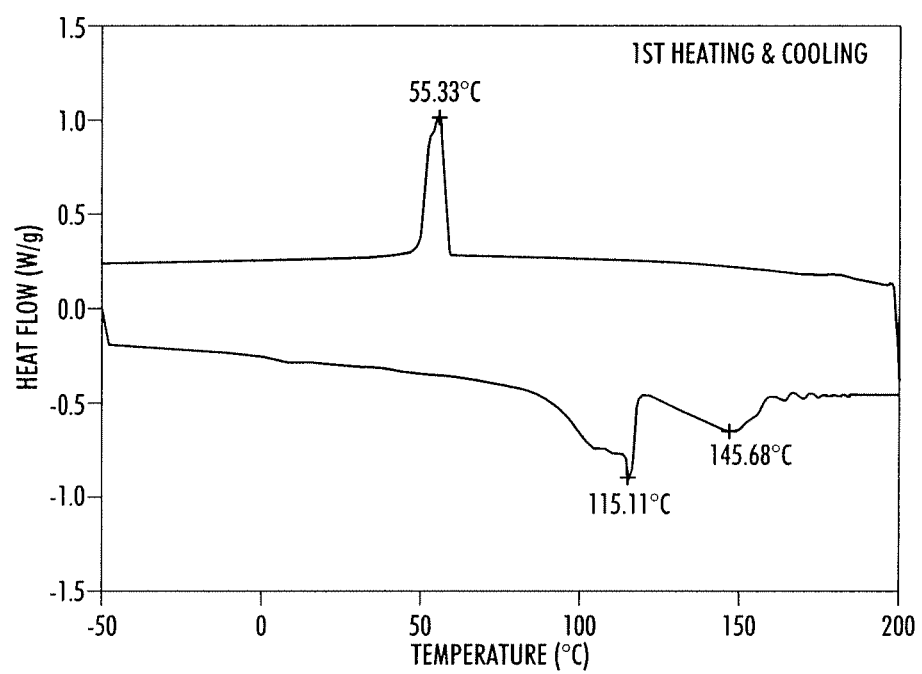
FIG. 3 is a graph illustrating differential scanning calorimetry data of a mixture of a crystalline compound and an amorphous compound of a phase change ink made according to the present embodiments (the DSC data was obtained on a Q1000 Differential Scanning Calorimeter (TA Instruments) at a rate of 10° C./min from −50 to 200 to −50° C.).
Figure 4:
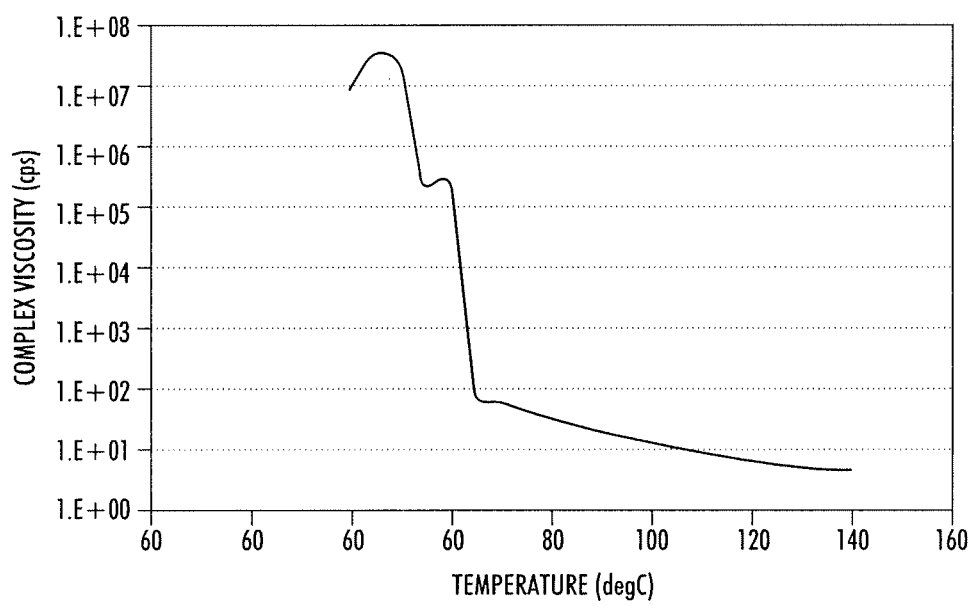
FIG. 4 is a graph illustrating rheology data of an ink sample made according to the present embodiments. All of the rheology measurements were made on a RFS3 Rheometer (TA instruments), using a 25 mm parallel plate, at a frequency of 1 Hz; the method used was a temperature sweep from high to low temperatures, in temperature steps of 5°, a soak (equilibration) time of 120 seconds between each temperature and at a constant frequency of 1 Hz).

FIG. 3 shows DSC data of the ink base sample containing Compound T3 and TMC. Both $T_{melt}$ and $T_{crys}$ shifted to lower temperatures compared to that of Compound T3 alone. Yet the ink base sample continued to show relatively sharp phase transitions even when mixed with the amorphous material. FIG. 4 shows rheology data of the same ink base sample. The ink base showed phase transition to >$10^6$ cps at about 65° C. The phase transition temperature can be adjusted by selecting different compounds and changing the crystalline/amorphous ratio within the desirable temperature range (65° C.<T<130° C.). Furthermore, the viscosity at around 130° C. (jetting temperature) was about 6 cps and can be adjusted by changing the crystalline/amorphous ratio.

Example 3

Rate of Crystallization

Rate of crystallization is one of the important ink properties for production printing applications, as it dictates the rate at which the ink can be touched after printing. This property was examined for without dye (ink base, Sample 1) and with 3 wt % dye (Sample 2). The ink formulations are shown in Table 2 together with rate of crystallization data obtained by TROM (Time Resolved Optical Microscopy) experiments. The rates of crystallization were very fast both in the absence of dye (ink base) and presence of dye.

TABLE 2

Ink formulations and rate of crystallization data.

| | Ink formulation (wt %) | | | | | |
|---|---|---|---|---|---|---|
| Ink ID | di-tert-butyl terephthalate (T3) | Tri-DL-menthyl citrate (TMC) | Orasol Blue GN | Time crys onset (s) | Time crys elapsed (s) | Time crys total (s) |
| Sample 1 (ink base) | 70 | 30 | | 2 | 7 | 9 |
| Sample 2 | 67.9 | 29.1 | 3 | 2 | 3 | 5 |

Example 4

Robustness Performance

To the formulation ratio of the prepared ink base, 3 wt % of cyan dye (commercially available as Ciba Orasol Blue GN) was added, which showed good solubility in the ink (ink formulation: Crystalline/Amorphous/Dye=67.9/29.1/3 (wt %)=2.72/1.16/0.12 (g)). The ink was then used for K-proof print test examination on coated paper Xerox Digital Color Elite Gloss, 120 gsm (DCEG) by a K Printing Proofer (manufactured by RK Print Coat Instrument Ltd., Litlington, Royston, Heris, SG8 0OZ, U.K.) When a scratch/gouge finger with a curved tip at an angle of about 15° from vertical, with a weight of 528 g applied, was drawn across the image at a rate of approximately 13 mm/s, no ink was visibly removed from the image. The scratch/gouge tip is similar to a lathe round nose cutting bit with radius of curvature of approximately 12 mm.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:
1. A phase change ink comprising:
an amorphous compound; and
a crystalline compound comprising the following structure:

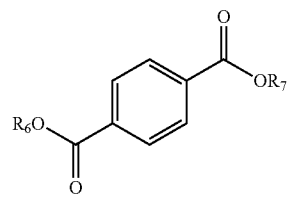

wherein $R_6$ and $R_7$ are t-butyl, further wherein the crystalline compound is present in an amount of from 60 percent to 95 percent by weight of the total weight of the phase change ink; wherein the phase change ink crystallizes in less than 15 seconds.

2. The phase change ink from claim 1, wherein the amorphous compound comprises an ester of tartaric acid of Formula I

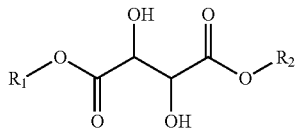

Formula I wherein each $R_1$, $R_2$, $R_3$, $R_4$, and $R_5$ is independently an alkyl group, wherein the alkyl is straight, branched or cyclic, saturated or unsaturated, having from 1 to 40 carbon atoms, or a substituted or unsubstituted aromatic or heteroaromatic group, and mixtures thereof.

3. The phase change ink from claim 2, wherein the amorphous compound is tri-DL-menthyl citrate.

4. The phase change ink of claim 1 further comprising a colorant selected from the group consisting of a pigment, dye and mixtures thereof.

5. The phase change ink of claim 4, wherein the colorant is present in an amount from 0.1 percent to 50 percent by weight of the total weight of the phase change ink.

6. The phase change ink of claim 1, wherein the amorphous compound is present in an amount of from 5 percent to 40 percent by weight of the total weight of the phase change ink.

7. The phase change ink of claim 1, wherein the crystalline/amorphous ratio is from 60:40 to 95:5.

8. The phase change ink of claim 1 having a viscosity of less than 22 cps in a jetting range from 100 to 140° C.

9. The phase change ink of claim 1 having a viscosity of greater than $10^6$ cps at room temperature.

10. A phase change ink comprising:
an amorphous compound comprises an ester of tartaric acid of Formula I

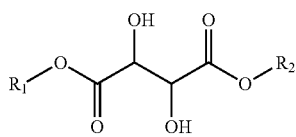

Formula I wherein each $R_1$, $R_2$, $R_3$, $R_4$, and $R_5$ is independently an alkyl group, wherein the alkyl is straight, branched or cyclic, saturated or unsaturated, substituted or unsubstituted, having from 1 to 40 carbon atoms, or a substituted or unsubstituted aromatic or heteroaromatic group, and mixtures thereof, wherein the tartaric acid backbone is selected from L-(+)-tartaric acid, D-(−)-tartaric acid, DL-tartaric acid, or meso-tartaric acid, and mixtures thereof;
a crystalline compound comprises the following structure:

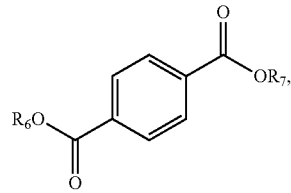

wherein $R_6$ and $R_7$ are t-butyl, further wherein the crystalline compound is present in an amount of from 60 percent to 95 percent by weight of the total weight of the phase change ink; and a colorant.

* * * * *